(12) United States Patent
Radhakrishnan et al.

(10) Patent No.: US 8,566,427 B2
(45) Date of Patent: Oct. 22, 2013

(54) DESKTOP ENVIRONMENT SOLUTIONS METHODS AND SYSTEMS

(75) Inventors: Ramesh Radhakrishnan, Austin, TX (US); Arun Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 363 days.

(21) Appl. No.: 12/362,625

(22) Filed: Jan. 30, 2009

(65) Prior Publication Data

US 2010/0198906 A1   Aug. 5, 2010

(51) Int. Cl.
*G06F 15/177* (2006.01)
*G06F 15/16* (2006.01)
*G06F 9/00* (2006.01)

(52) U.S. Cl.
USPC .............................. 709/220; 709/229; 713/2

(58) Field of Classification Search
USPC .............................. 709/220, 222, 229; 713/2
See application file for complete search history.

(56) References Cited

U.S. PATENT DOCUMENTS

| | | | |
|---|---|---|---|
| 7,050,961 B1 | 5/2006 | Lee et al. | |
| 2006/0248328 A1* | 11/2006 | Iszlai et al. | 713/2 |
| 2009/0043840 A1* | 2/2009 | Cherukuri et al. | 709/203 |
| 2009/0099919 A1* | 4/2009 | Schultheiss et al. | 705/14 |
| 2010/0023755 A1* | 1/2010 | Kotani et al. | 713/156 |
| 2010/0106826 A1* | 4/2010 | Sugawara | 709/224 |

* cited by examiner

*Primary Examiner* — Jeong S Park
(74) *Attorney, Agent, or Firm* — Baker Botts L.L.P.

(57) ABSTRACT

A method for providing a desktop environment solution is provided. The method may include providing a client information handling system and authenticating the client to a network. Furthermore, a hardware configuration of the client may be dynamically examined, and an appropriate desktop environment solution may be selected based on the hardware configuration.

12 Claims, 3 Drawing Sheets

DESKTOP ENVIRONMENT SOLUTIONS METHODS AND SYSTEMS

TECHNICAL FIELD

The present disclosure relates generally to the field of information handling systems, and more specifically, to the provisioning and deployment of desktop environment solutions.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, numerous desktop environment solutions exist in large enterprise networking systems. A desktop environment solution may be intuitive mechanism for a user to interact with the information handling system using icons, windows, and other graphic user interface (GUI) components. Thus, a desktop environment solution may be a method of providing an IHS user interface to a remote user without it being physically installed on a client IHS. To this end, a desktop environment solution may be delivered over a network from a server to a client IHS. However, different desktop environment solutions may be suitable for different client IHS devices depending on the hardware configurations and resources of the client IHS. Furthermore, the type of network connection used to couple the server and the client IHS may also affect the performance of certain desktop environment solutions. Further still, the security of the client IHS may also be a determining factor since user data may be compromised if the client IHS can be hacked by malicious users. Therefore, depending on the type of client IHS and other external factors, one or more desktop environment solutions may not be appropriate. Thus, a need exists for dynamic methods, systems, and media to determine the most appropriate desktop environment solution for a particular client IHS.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for providing a desktop environment solution. The method may include providing a client information handling system (IHS) and then authenticating the client IHS to a network. Moreover, the method may include determining a client resource of the client IHS and dynamically selecting a desktop environment solution for the client IHS based on the client resource.

Another aspect of the present disclosure provides for an information handling system (IHS). The IHS may include a client IHS and a server in communication with the client IHS through a network. Additionally, the server may be operable to provide a desktop environment solution to the client IHS based on a client resource.

A further aspect of the present invention provides for a computer-readable medium having computer-executable instructions for performing a method for providing a desktop environment solution. The method may include providing a client information handling system (IHS) and then authenticating the client IHS to a network. Moreover, the method may include determining a client resource of the client IHS and dynamically selecting a desktop environment solution for the client IHS based on the client resource.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable mediums are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a server" refers to one or several servers, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
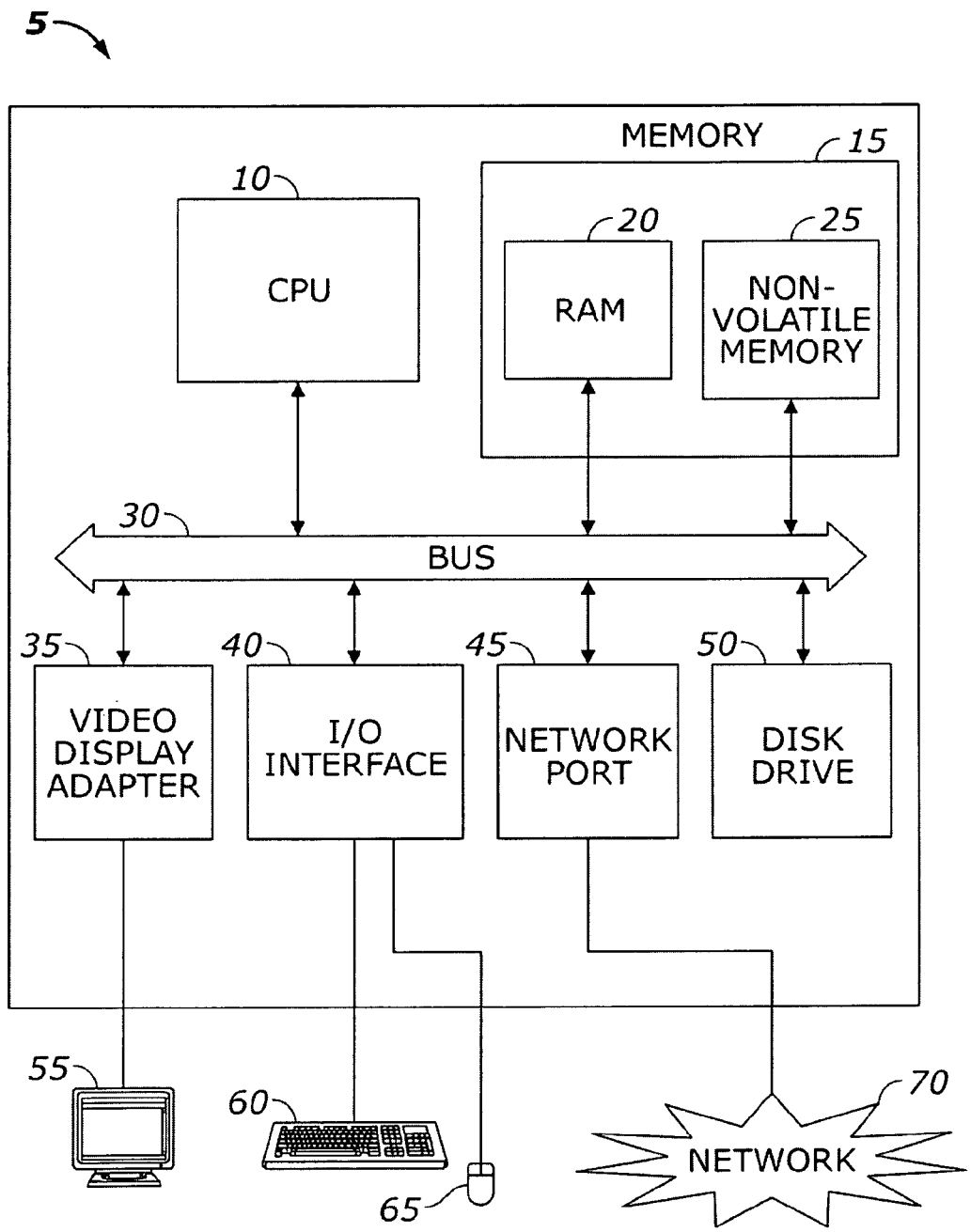
FIG. 1 represents an information handling system (IHS) in accordance with one aspect of the present disclosure.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
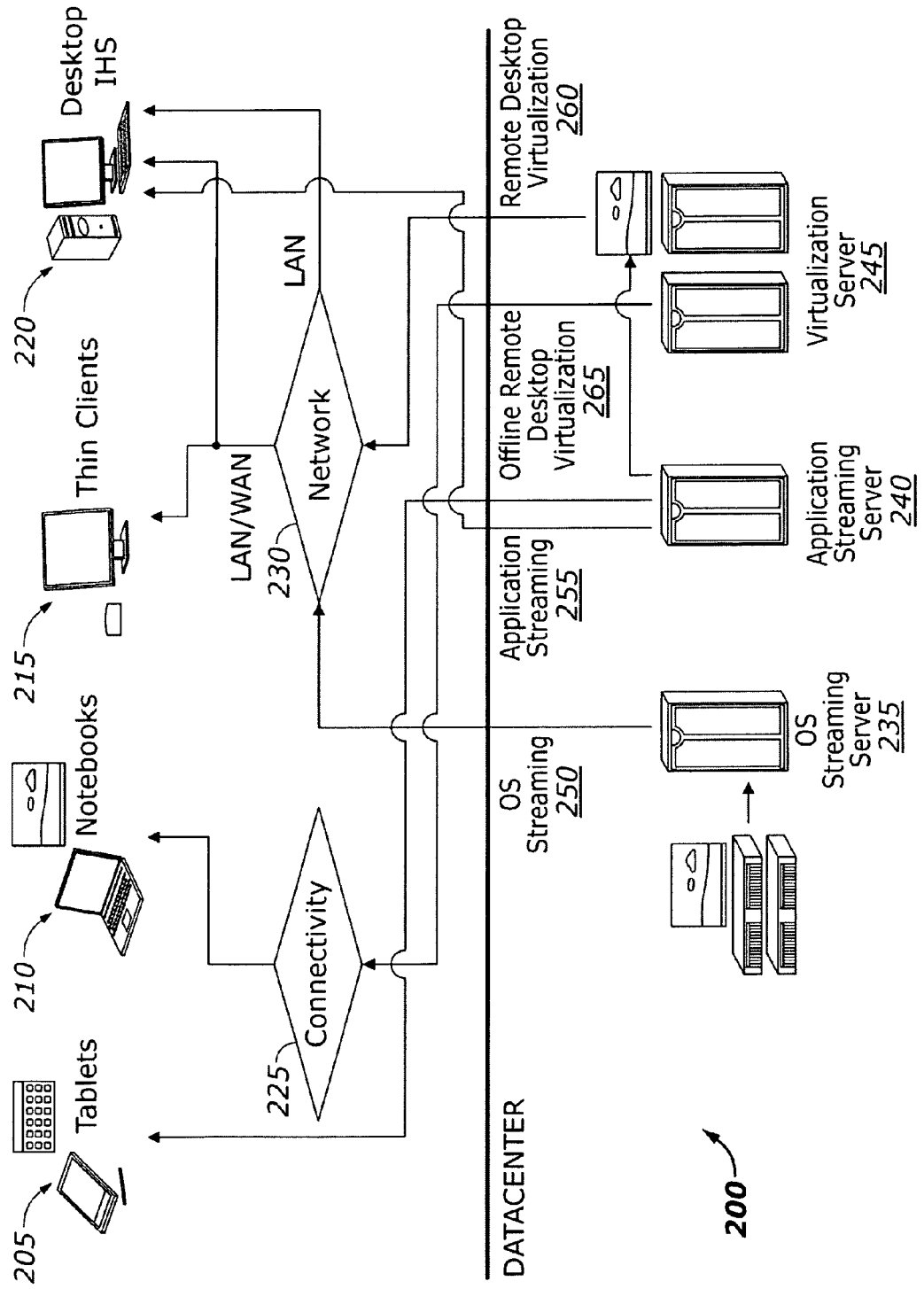
FIG. 2 provides a schematic illustrating a desktop environment delivery solution in accordance with one aspect of the present disclosure.

FIG. 2 provides a flow diagram of a dynamic desktop environment delivery, indicated generally at 200. More particularly, FIG. 2, may illustrate how different desktop environment delivery solutions from a host server or servers may be appropriate for different client IHSs depending on a client resource of the client IHS. Specifically, a client resource may refer to hardware configurations, network connectivity 225, security levels, and or the like of a client IHS. Furthermore, FIG. 2 may depict the dynamic selection of desktop environment delivery solutions in response to the determination of such characteristics of the client IHS. Thus, the desktop environment delivery solution or method may be said to be "context aware." In addition, as used herein, hardware configurations may refer to CPU speed, system memory, storage capacity, or the like. Desktop environment delivery solutions may include, but are not limited to, operating system (OS) streaming 250, application streaming 255, remote desktop virtualization 260, and offline remote desktop virtualization 265 implementations. Moreover, a client IHS may be one of any number of devices including, but not limited to, standalone tower IHSs, notebooks, thin clients, and mobile devices. Furthermore, depending on the desktop environment delivery solution, a host server specific to the desktop environment may be employed. For example, employing an OS streaming 255 solution may require the use of an OS streaming server 235 while an application streaming solution 255 may require the use of an application streaming server 240. Streaming, as used herein, may refer to any method of transmitting data in real time from a host server to a receiving (e.g., client) IHS. In certain instances, this transmission may be accomplished through the use of a network 230 such as a Local Area Network (LAN), Wide Area Network (WAN), the Internet, or the like.

Thus, OS streaming 250 may be a process by which an image of an OS may be streamed from an OS streaming server 235 to a client IHS rather than providing the OS to the client IHS locally, such as on its hard drive. Additionally, OS streaming 250 may be appropriate for "thick" clients, i.e., client IHSs having hardware configurations with relatively high computing power and/or system memory such as standalone tower IHSs 220, workstations, and the like. In certain applications, OS streaming 250 may require a LAN rather than a WAN to provide improved end user experience. OS streaming 250 may include on-demand desktop streaming (ODDS) and/or any other method protocol operable to stream an OS.

Similarly, application streaming 255 may refer to a process by which an application is streamed from an application streaming server 240 to a client IHS. As used herein, an application may refer to any software program, e.g., word processors, spreadsheets, etc., managed by an OS. Application streaming 255 may be appropriate for both thick clients and "thin" clients 215. Thin clients 215 may refer to client IHSs having hardware configurations with reduced computing power and system memory as compared to thick clients. Thin clients may be couples to server via a network and may use an external processor. For example, a thin client may rely on the server for processing power and may focus on conveying input and output data between a user and the server. Thick clients then, may refer to client IHSs having hardware configurations capable of more and/or greater functionality, such as independent processing, memory and the like, compared to thin clients 215. As such, thick clients may include a local internal processing unit. In addition, thick clients may typically pass information to the server for only communication and storage purposes.

As previously mentioned, hardware configurations may vary between thick and thin clients. For example, memory configuration may range from about 64 MB to 1024 for thin clients while ranging from about 512 MB to 4096 MB for thick clients. As another example, thin clients may utilize flash drives for storage with capacity in the range of about 1 GB to 20 GB whereas thick clients may utilize rotary hard drives for storage with capacity in the range of about 100 GB to at least 500 GB.

In yet another aspect, processing units may vary between thin and thick clients. Thin clients may employ embedded processing units targeting small devices. In some implementations, processing units of thin clients may operate in the range of about 100 MHz to 500 MHz clock frequency. Alternatively, thick clients may utilize general purpose or multi-core processing units which may operate, in some implementations, at about 1000 MHz to 3000 MHz clock frequency.

Furthermore, application streaming 255 may also be suitable for use with mobile devices such as personal digital assistants (PDAs), tablets 205, and the like. In certain application streaming 255 implementations, the OS may reside locally on the client IHS while specific applications may be streamed to it and run inside software silos that are insulated from the other local applications. In addition, application streaming 255 may be employed in conjunction with certain desktop virtualization implementations, discussed further below.

Both remote desktop virtualization 260 and offline remote desktop virtualization 265 may deliver entire desktop virtual machines (VMs) from a virtualization server 245 to client IHSs. A desktop VM (not pictured) may refer to a software implemented machine that may resemble an IHS such as a personal computer, for example, to a user. Multiple desktop VMs may be hosted by a single physical virtualization server 245 and may all share the virtualization server's resources such as its processor(s), memory, and long-term storage as well as network resources of the IHS. Despite the underlying resource-sharing structure, each desktop VM may believe itself to exist as its own separate IHS with its own separate resources. Remote desktop virtualization 260 implementations, such as Dell's Virtual Remote Desktop for example, may provide an advantage in that all coupled desktop VMs may be centrally managed and secured via the virtualization server 245. Moreover, most resources including, but not limited to, computing power (i.e., CPU speed) and system memory may be provided by the virtualization server 245. Thus, in order to communicate with the virtualization server 245 and access its resources, a client IHS must be connected or coupled to a network at all times. Consequently, remote desktop virtualization 260 may be appropriate for thin clients 215, and also thick clients, such as stand-alone tower IHSs, that maintain a constant connection to the virtualization server 245 via a network 230, e.g., a LAN or WAN.

The present disclosure contemplates, however, that some applications may not be compatible to execute in a remote desktop virtualization 260 environment. For example, some applications may require software patches or may require the OS to be updated periodically. Other applications may be incompatible with certain display protocols of the remote desktop virtualization 260. In these situations, remote desktop virtualization 260 may be implemented in conjunction with application streaming 255. Thus, the applications that are unable to execute within the remote desktop virtualization 260 environment may be streamed separately to the client IHS to physically execute on the client IHS hardware.

As previously discussed access to the desktop VMs on the virtualization server 245 may require a client IHS to be connected or coupled to a network. Offline remote desktop virtualization 265 implementations, however, may enable virtualization without the need for a connection to a network. For example, offline remote desktop virtualization 265 may enable a client IHS to physically transfer the actual VM that it is currently accessing remotely from a virtualization server 245 across a network 230. As such, the VM may be run on a local IHS or machine. During this process, the desktop VM, or an image thereof may be copied to the client IHS where it can be executed locally while disconnected from the network. When the client IHS connects back to the network, the local desktop VM on the client IHS may be powered off and copied back into the virtualization server 245. The changes made to the desktop VM while it was checked or copied out may then be copied back to the virtualization server 245 where the client IHS can once again access the desktop VM via the network. In this manner, a client IHS may implement remote desktop virtualization without the need to maintain a constant connection to the network. However, because offline remote desktop virtualization 265 may require a desktop VM to be copied locally to a client IHS, the client IHS may require some computing power and system memory of its own in order to appropriately implement this solution. In other words, when a desktop VM is copied locally to the client IHS, the client IHS may need certain local hardware of its own to execute the desktop VM rather than relying on a remote server as is the case with remote desktop virtualization. Therefore, IHSs such as notebooks 210 or the like may be suitable for an offline remote desktop virtualization 265 solution.

While FIG. 2 depicts one aspect of a desktop environment delivery solution matched with certain client IHS devices, it should be rioted that the present disclosure is not limited to these combinations. Other desktop environment delivery solutions in combinations with other types of client IHS devices are also encompassed within the present disclosure. Furthermore, multiple desktop environment delivery solutions may exist on any single server rather than on separate servers as illustrated. For example, a single server maybe capable of delivering both an application streaming 255 solution and a remote desktop virtualization 260 solution.

In one implementation, software may be located on a server and may be operable to communicate between a client IHS and the desktop environment delivery solutions. Specifically, the software may be operable to retrieve data upstream from the client IHS regarding its capabilities such as compute power, network bandwidths, security aspects, and/or the like. The software may also be aware of downstream components, i.e., the desktop environment delivery solutions, in order to match the client IHS with the appropriate desktop environment delivery solution based on the capabilities or resources of the client IHS.

Figure 3:
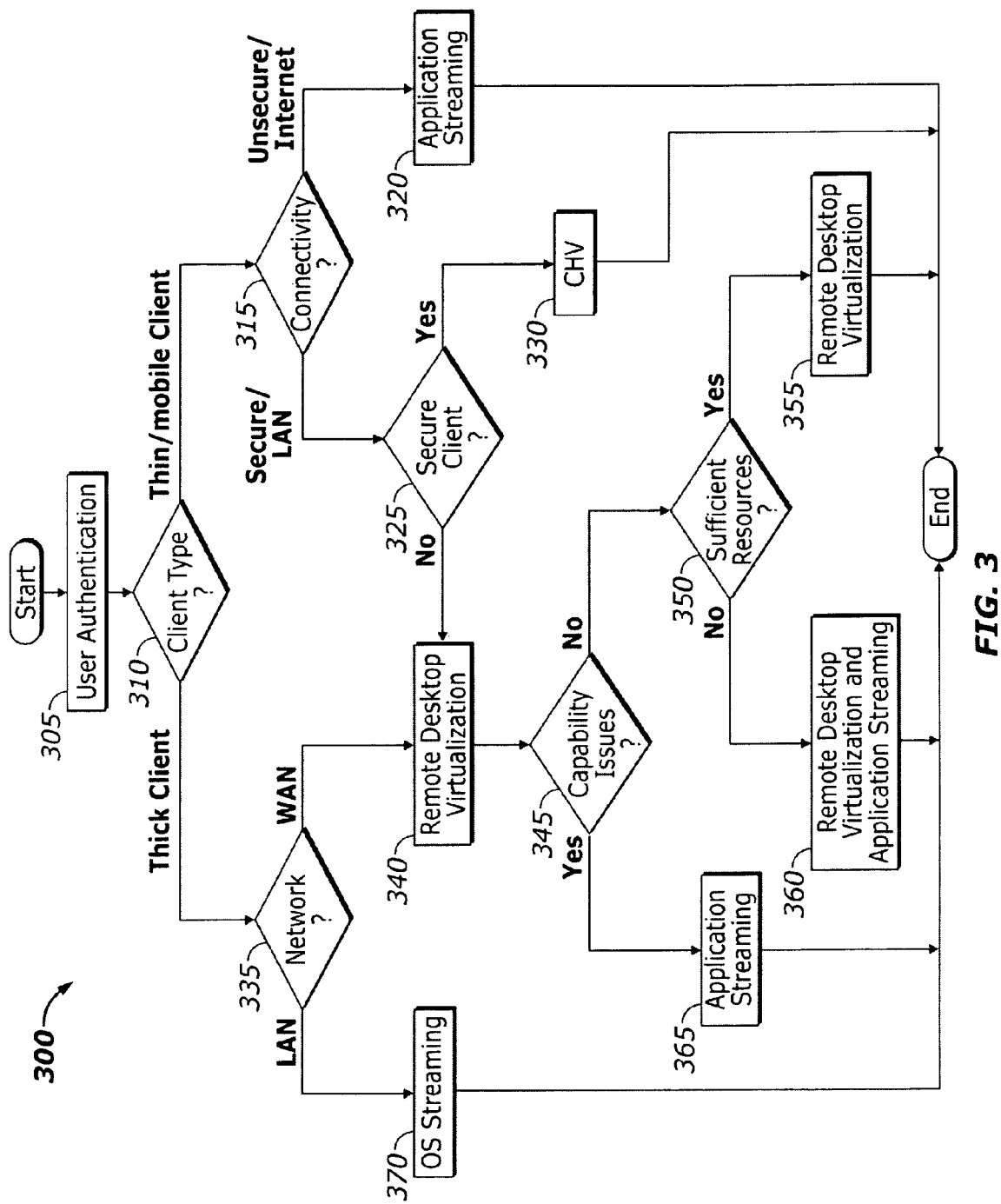
FIG. 3 provides a flow diagram illustrating a method for providing a desktop environment in accordance with one aspect of the present disclosure.

Accordingly, FIG. 3 represents a flow diagram illustrating a method for providing a desktop environment delivery solution, indicated generally at 300. The method 300 may enable the dynamic selection of the most appropriate desktop environment delivery solution to a client IHS based on resources of the client IHS, such as its hardware configuration, network connection, and level of security. FIG. 3 is intended to illustrate one possible implementation of the present disclosure. Thus, all other methods or processes combining various desktop environment delivery solutions with client IHSs having different hardware and/or network configurations are also contemplated.

The method 300 may begin in step 305 where a client IHS may enter an authentication process before being able to access a network. During the authentication process, a user's credentials (e.g., login and password) may be checked to ensure that the user has appropriate access rights to the network. Then, in step 310, the type of client IHS may be determined, such as by selecting either a thick client or a thin client. If the selected client IHS is a thick client, the type of network connection being used may then be established, such as by using certain scripts, software commands or the like, in step 335. If the network is a LAN, then OS streaming may be used in step 370, since a LAN may provide adequate bandwidth, and a thick client may have enough processing speed, memory, etc. to execute the operating system. If, on the other hand, the network is a WAN, remote desktop virtualization may be employed as shown in step 340. Then, in step 345, the remote desktop virtualization solution may be examined as to whether it may have compatibility problems with certain applications. For example, a list of incompatibilities between user applications and the remote desktop virtualization solution may be maintained. Furthermore, failures in the execution of applications when using a remote desktop solution may also result in an update to the list to record the incompatibility. If so, these applications may be streamed to the client IHS in step 365 to execute in conjunction with the remote desktop virtualization. If not, the client IHS may then be examined as to whether its hardware capabilities exceed a predetermined level For example, the client IHS's CPU speed, memory, storage space, and/or the like may be examined to determine its ability to execute offline remote desktop virtualization in step 350. If the client IHS is determined to have exceeded the predetermined level, offline remote desktop virtualization may be used in step 355 to enable the client to check out a desktop VM. Otherwise, in step 360, virtual desktop virtualization may still be employed with application streaming.

If the client type is determined to be a thin client in step 310, however, then a determination as to the type of connectivity between the network and the client IHS may occur in step 315. If the connectivity is determined to be an unsecure connection such as over the Internet or any other unencrypted connection, for example, application streaming may be chosen in step 320. The connectivity may be determined to be an unsecure connection in the case of an unsecure thin client, for example. Alternatively, with a secure thin client, connectivity between the network and the client IHS may be secure. If, however, the connection is a secure connection or a LAN connection, then security aspects of the client IHS may be examined in step 325. For example, a client IHS may or may not be executing a security software program, such as a Trusted Platform Management (TPM), to ensure the security of the device. If the client IHS is determined to be secure, i.e., if it has TPM, for example, Client Hosted Virtualization (CHV) may be implemented in step 320. CHV may enable desktop virtualization to be executed on the client IHS hardware itself rather than through a virtualization server. On the other hand, if the client IHS is deemed unsecure, then remote desktop virtualization may be employed in step 340.

Furthermore, methods of the present disclosure may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that the abovementioned media may take various forms such as cards, tapes, magnetic disks (e.g., floppy disk or hard drive), optical disks (e.g., compact disk read only memory ("CD-ROM") or digital versatile disc ("DVD")) or any other medium/media which can be used to store desired information and which can accessed by an IHS. It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for providing a desktop environment delivery solution, the method comprising:
   providing a client information handling system (IHS);
   authenticating the client IHS to a network;
   determining a client resource of the client IHS; and
   dynamically selecting a desktop environment delivery solution for the client IHS based on the client resource, wherein the client resource is selected based upon hardware configuration, and network connection type,
   wherein the hardware configuration is a thick client or a thin client, wherein the thick client comprises an internal processing unit and the thin client comprises an external processing unit,
   wherein the desktop environment delivery solution is a client hosted virtualization, wherein the client hosted virtualization is selected as the desktop environment solution if the client IHS is determined to be a thin client having a Local Area Network (LAN) connection.

2. The method of claim 1, wherein the desktop environment delivery solution is an operating system (OS) streaming, wherein the OS streaming is selected as the desktop environment solution if the client IHS is determined to be the thick client having a Local Area Network (LAN) connection.

3. The method of claim 1, wherein the desktop environment delivery solution is an application streaming, wherein the application streaming is selected as the desktop environment delivery solution if the client IHS is determined to be the thin client having a Wide Area Network (WAN) connection.

4. The method of claim 1, wherein the desktop environment delivery solution is a remote desktop virtualization, wherein the client resource is selected further based upon security level of the client IHS, wherein the remote desktop virtualization is selected as the desktop environment delivery solution if the client IHS is determined to be an unsecure thin client having a Local Area Network (LAN) connection or if the client IHS is determined to be the thick client having a Wide Area Network (WAN) connection.

5. The method of claim 4 further comprising:
   determining whether an application is compatible with the remote desktop virtualization; and
   if not compatible, executing the application streaming on the client IHS in association with the remote desktop virtualization, the application streaming streamed separately to the client IHS from the remote desktop virtualization and physically executed on the client IHS.

6. The method of claim 5 further comprising determining whether the client IHS has a hardware capability that exceeds a predetermined level in order to execute an offline remote desktop virtualization solution, if the application is compatible with remote desktop virtualization.

7. The method of claim 6, wherein the desktop environment delivery solution is the offline remote desktop virtualization, wherein offline remote desktop virtualization solution is selected as the desktop environment delivery solution if the hardware capability of the client IHS exceeds the predetermined level, and wherein otherwise, the application streaming is executed in association with the remote desktop virtualization.

8. An information handling system (IHS) comprising:
   a client IHS; and
   a server in communication with the client IHS through a network, wherein the server is operable to provide a desktop environment delivery solution to the client IHS, wherein the desktop environment delivery solution is selected based on a client resource, wherein the client resource is selected based upon client IHS hardware configuration, and network connection type, wherein the hardware configuration is a thick client or a thin client, wherein the thick client comprises an internal processing unit and the thin client comprises an external processing unit, and wherein the desktop environment delivery solution is a client hosted virtualization, wherein the client hosted virtualization is selected as the desktop environment solution if the client IHS is determined to be a thin client having a Local Area Network (LAN) connection.

9. The system of claim 8, wherein the desktop environment delivery solution is an operation system (OS) streaming, wherein the OS streaming is selected as the desktop environment delivery solution if the client IHS is determined to be the thick client having a Local Area Network (LAN) connection.

10. The system of claim 8, wherein the desktop environment delivery solution is an application streaming, wherein the application streaming is selected as the desktop environment delivery solution if the client IHS is determined to be the thin client having a Wide Area Network (WAN) connection.

11. The system of claim 8, wherein the desktop environment delivery solution is a remote desktop virtualization, wherein the client resource is selected further based upon security level of the client IHS, wherein the remote desktop virtualization is selected as the desktop environment delivery solution if the client IHS is determined to be an unsecure thin client having a Local Area Network (LAN) connection or if the client IHS is determined to be the thick client having a Wide Area Network (WAN) connection.

12. The system of claim 8, further comprising an application stored on the server, wherein the desktop environment delivery solution comprises offline remote desktop virtualization, wherein offline remote desktop virtualization solution is selected as the desktop environment delivery solution if the application is compatible with remote desktop virtualization and if the client IHS has a hardware capability that exceeds a predetermined level.

\* \* \* \* \*